US009030532B2

(12) United States Patent
Starkweather et al.

(10) Patent No.: US 9,030,532 B2
(45) Date of Patent: May 12, 2015

(54) STEREOSCOPIC IMAGE DISPLAY

(75) Inventors: Gary K. Starkweather, Bellevue, WA (US); Michael J. Sinclair, Kirkland, WA (US); Sing Bing Kang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1131 days.

(21) Appl. No.: 10/922,769

(22) Filed: Aug. 19, 2004

(65) Prior Publication Data

US 2006/0038880 A1   Feb. 23, 2006

(51) Int. Cl.
*H04N 13/04* (2006.01)

(52) U.S. Cl.
CPC ....... *H04N 13/0477* (2013.01); *H04N 13/0402* (2013.01); *H04N 13/0472* (2013.01); *H04N 13/0479* (2013.01); *H04N 13/0481* (2013.01); *H04N 13/0484* (2013.01)

(58) Field of Classification Search
USPC .................................................. 348/51, 78
See application file for complete search history.

(56) References Cited

U.S. PATENT DOCUMENTS

| | | | |
|---|---|---|---|
| 4,935,810 A * | 6/1990 | Nonami et al. ................. 348/45 |
| 5,287,437 A * | 2/1994 | Deering ........................ 345/427 |
| 5,467,104 A * | 11/1995 | Furness et al. ..................... 345/8 |
| 5,644,427 A * | 7/1997 | Omori et al. ................... 359/464 |
| 5,712,732 A | 1/1998 | Street |
| 5,777,720 A * | 7/1998 | Shapiro et al. ................ 351/237 |
| 5,870,136 A | 2/1999 | Fuchs et al. |
| 6,014,164 A | 1/2000 | Woodgate et al. |
| 6,091,410 A | 7/2000 | Lection et al. |
| 6,163,336 A * | 12/2000 | Richards ........................ 348/42 |
| 6,211,848 B1 | 4/2001 | Plesniak et al. |
| 6,275,254 B1 | 8/2001 | Beeteson et al. |
| 6,326,994 B1 | 12/2001 | Yoshimatsu |
| 6,380,952 B1 | 4/2002 | Mass et al. |
| 6,392,689 B1 | 5/2002 | Dolgoff |

(Continued)

FOREIGN PATENT DOCUMENTS

WO    WO 2004052225 A2 *   6/2004
WO    WO2005009052(A1)      1/2005

OTHER PUBLICATIONS

Perlin et al., "An Autostereoscopic Display", 2000, Media Research Laboratory, Dept. of Computer Science, New York University, SIGGRAPH.*

(Continued)

*Primary Examiner* — Mehrdad Dastouri
*Assistant Examiner* — James Anderson, II
(74) *Attorney, Agent, or Firm* — Stephen A. Wight; Judy Yee; Micky Minhas

(57) ABSTRACT

Stereoscopic image display is described. In an embodiment, a location of the eye pupils of a viewer is determined and tracked. An image is displayed within a first focus for viewing with the left eye of the viewer, and the image is displayed within a second focus for viewing with the right eye of the viewer. A positional change of the eye pupils is tracked and a sequential image that corresponds to the positional change of the eye pupils is generated for stereoscopic viewing. In another embodiment, an image is displayed for stereoscopic viewing and a head position of a viewer relative to a center of the displayed image is determined. A positional change of the viewer's head is tracked, and a sequential image that corresponds to the positional change of the viewer's head is generated for stereoscopic viewing.

36 Claims, 10 Drawing Sheets

(56) References Cited

U.S. PATENT DOCUMENTS

| | | | |
|---|---|---|---|
| 6,456,737 | B1 | 9/2002 | Woodfill et al. |
| 6,481,849 | B2 | 11/2002 | Martin et al. |
| 6,496,598 | B1 | 12/2002 | Harman |
| 6,545,650 | B1 * | 4/2003 | Yamada et al. .............. 345/7 |
| 6,578,962 | B1 * | 6/2003 | Amir et al. .............. 351/209 |
| 6,659,611 | B2 | 12/2003 | Amir et al. |
| 6,676,259 | B1 | 1/2004 | Trifilo |
| 6,714,665 | B1 * | 3/2004 | Hanna et al. .............. 382/117 |
| 6,750,904 | B1 | 6/2004 | Lambert |
| 6,788,274 | B2 | 9/2004 | Kakeya |
| 6,956,576 | B1 | 10/2005 | Deering et al. |
| 8,199,186 | B2 | 6/2012 | Florencio et al. |
| 2003/0113012 | A1 * | 6/2003 | Yoon .............. 382/154 |
| 2004/0192430 | A1 | 9/2004 | Burak et al. |
| 2005/0089212 | A1 | 4/2005 | Mashitani et al. |
| 2006/0038881 | A1 | 2/2006 | Starkweather et al. |
| 2006/0139447 | A1 | 6/2006 | Unkrich |
| 2010/0149610 | A1 | 6/2010 | Schwerdtner et al. |
| 2010/0194886 | A1 | 8/2010 | Asari et al. |
| 2010/0225743 | A1 | 9/2010 | Florencio et al. |

OTHER PUBLICATIONS

Perlin; "An Autosteroscopic Display"; International Conference on Computer Graphics and Interactive Techniques, 2000; pp. 319-326.

Kitamura, et al.; Interactive Stereoscopic Display for Three or More Users; International Conference on Computer Graphics and Interactive Techniques, Aug. 2001; pp. 231-140.

Ohno, et al; "A Free-head, Simple Calibration, Gaze Tracking System That Enables Gaze-Based Interaction"; 2004 ACM; pp. 115-122.

Duchowski, et al; "3D Eye Movement Analysis for VR Visual Inspection Training"; ACM 2002; pp. 103-110.

Talmi, et al.; "Eye and gaze tracking for vusually controlled interactive stereoscopic displays"; 1999 Elsevier Science B.V.; vol. 14, No. 10; pp. 799-810.

Morimoto, et al; "Pupil detection and tracking using multiplelight sources"; 2000 Elsevier Science B.V., Nol. 18, No. 4, pp. 331-335.

Honda, et al.; "Second version of 3-D display system by Fan-like Array of Projection Optics"; 2003 SPIE-IS&T, vol. 5006; pp. 118-127.

Son, et al.; "A Desktop Autostereoscopic Display with Head-Tracking Capability"; Proceedings of the SPIE—The International Society for Optical Engineering; 2001. pp. 160-164.

Little, et al.; "Multiperspective autostereoscopic display"; SPIE vol. 2219 Cockpit Displays 1994; pp. 388-394.

Fehn, et al., "An Evolutionary and Optimised Approach on 3D-TV", retrieved on Jan. 5, 2009 at <<http://www.cs.unc.edu/~marc/pubs/FehnIBC02.pdf>>, 8 pages.

Harrison, et al., "Pseudo-3D Video Conferencing with a Generic Webcam", IEEE Computer Society, 2008.

Suenaga, et al., "Poster: Image-Based 3D Display with Motion Parallax using Face Tracking", retrieved on Jan. 5, 2009 at <<http://ieeexplore.ieee.org/stamp/stamp.jsp?arnumber=04476617>>, IEEE Symposium on 3D User Interfaces, Mar. 8-9, 2008, pp. 161-162.

Toyama, "Head Parallax Tracking for Control of a Virtual Space: a Comparison of Algorithms", retrieved on Jan. 5, 2009 at <<http://ieeexplore.ieee.org/stamp/stamp.jsp?arnumber=00816434>>, IEEE, 1999, pp. VI-1 to VI-6.

Office Action for U.S. Appl. No. 12/398,931, mailed on Nov. 10, 2011, Dinei Afonso Ferreira Florencio, "Three-Dimensional (3D) Imaging Based on MotionParallax", 12 pgs.

Non-Final Office Action for U.S. Appl. No. 13/490,341, mailed on Jul. 15, 2013, Dinei Afonson Ferreira Florencio et al., "Three-Dimensional (3D) Imaging Based on MotionParallax", 13 pages.

Office action for U.S. Appl. No. 13/490,341, mailed on Nov. 7, 2013, Florencio, et al., "Three-Dimensional (3D) Imaging Based on MotionParallax", 6 pages.

\* cited by examiner

STEREOSCOPIC IMAGE DISPLAY

TECHNICAL FIELD

This invention relates to stereoscopic image displays.

BACKGROUND

A conventional stereoscopic display system typically includes special glasses, a virtual reality helmet, or some other user attachable device. The user attachable device provides cues and feedback information corresponding to the relative position of a viewer to track positional changes of the viewer. The stereoscopic display system then displays an image for stereo viewing based on the positional feedback from the user attachable device.

Stereoscopic display systems can be implemented in gaming systems and other 3D ("three-dimensional") viewing systems to provide a stereo, or 3D, view of video images. While stereo viewing provides realistic and 3D interaction, many users would prefer to be unencumbered by a user attachable device that provides the user positional feedback to coordinate displaying the video images for stereo viewing. Accordingly, users of such stereoscopic display systems may prefer a system that locates and tracks a user without a user attachable device, such as special glasses or a virtual reality helmet.

SUMMARY

Stereoscopic image display is described herein.

In an implementation, a location of the eye pupils of a viewer is determined and tracked. An image is displayed within a first focus for viewing with the left eye of the viewer, and the image is displayed within a second focus for viewing with the right eye of the viewer. A positional change of the eye pupils is tracked and a sequential image that corresponds to the positional change of the eye pupils is generated for stereoscopic viewing.

In another implementation, an image is displayed for stereoscopic viewing and a head position of a viewer relative to a center of the displayed image is determined. A positional change of the viewer's head is tracked, and a sequential image that corresponds to the positional change of the viewer's head is generated for stereoscopic viewing.

BRIEF DESCRIPTION OF THE DRAWINGS

The same numbers are used throughout the drawings to reference like features and components.

DETAILED DESCRIPTION

Stereoscopic image display is described to provide true stereoscopic imaging without the use of special glasses, virtual reality helmets, or other user attachable devices that are typically required for stereoscopic image viewing. In one embodiment of stereoscopic image display, the eye pupils of a viewer are located and then tracked such that a stereoscopic image is displayed which corresponds to positional changes of the viewer's eye pupils. In another embodiment of stereoscopic image display, a position of a viewer's head relative to a stereoscopic display is determined and then tracked such that a stereoscopic image is displayed which corresponds to positional changes of the viewer's head.

While aspects of the described systems and methods for stereoscopic image display can be implemented in any number of different computing systems, environments, and/or configurations, embodiments of stereoscopic image display are described in the context of the following exemplary system architecture.

Figure 1A:
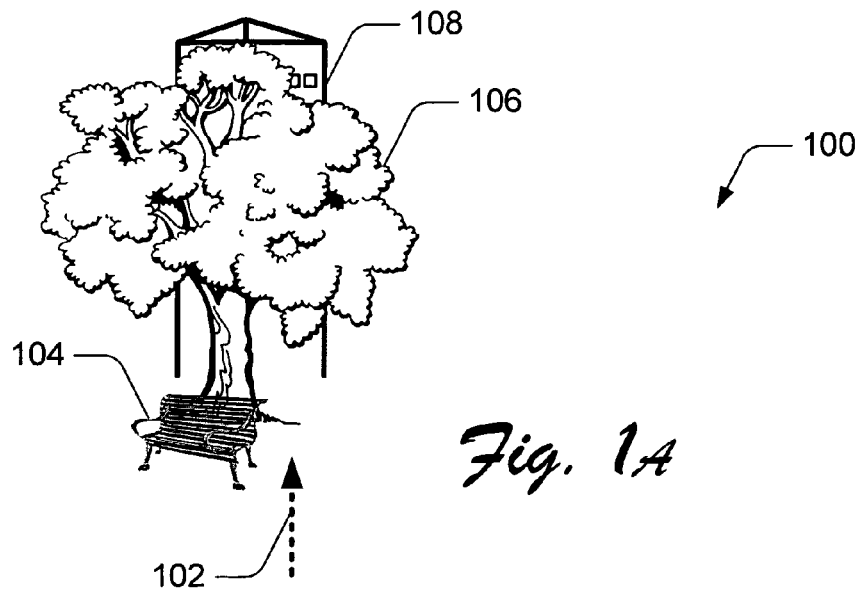
FIGS. 1A and 1B illustrate a simulation of motion parallax for stereoscopic image display.
Figure 1B:
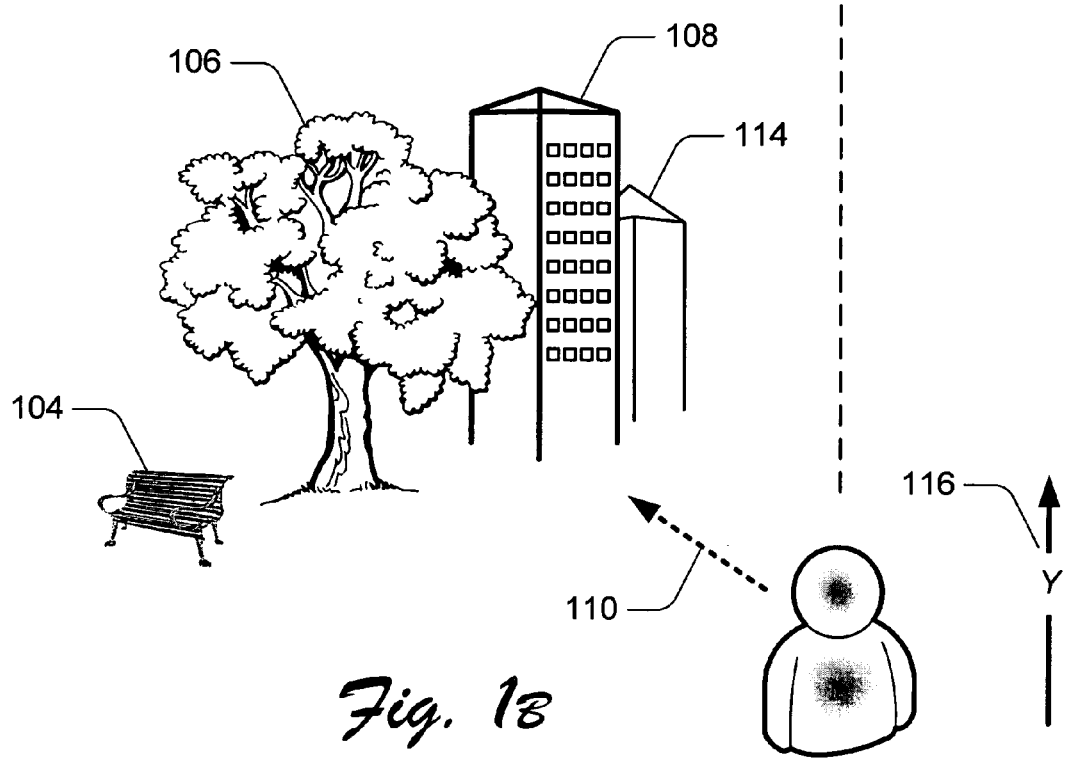

FIGS. 1A and 1B illustrate a simulation 100 of motion parallax for stereoscopic image display. Motion parallax is a perceptual characteristic that refers to how objects appear relative to each other and have different positions based on the field of view of a viewer. For example, FIG. 1A illustrates a field of view 102 in which a park bench 104 sits under a tree 106 that mostly obscures a building 108. FIG. 1B illustrates a second field of view 110 if the viewer moves in a direction 112 over a distance X. It becomes evident that the park bench 104 is not under tree 106, but actually some distance away from the tree. Further, most of building 108 is no longer obscured by tree 106, and even another building 114 appears visible to the viewer from behind building 108.

A perception of depth can also be determined from motion parallax. For example, the park bench 104 appeared to be positioned under tree 106 in FIG. 1A when viewed in the field of view 102. However, the park bench 104 is actually positioned some distance away from the tree 106 as determined by the depth perception obtained when the viewer moved in direction 112 over the distance X and viewed the objects in the field of view 110.

Motion parallax provides depth perception because, as a viewer moves, objects that are closer to the viewer move farther across the field of view than objects that are in the distance. For example, the park bench 104 is closest to the viewer, but appears to have moved farther from the viewer than building 108 when the viewer moved in direction 112. In a similar example of motion parallax, the fence posts of a fence near a road would appear to pass by quickly when traveling by car, whereas objects in the distance, such as trees, buildings, and the surrounding hills, appear to pass by slowly or stay in virtually the same position.

Additionally, if the viewer moves in a direction 116 over a distance Y as shown in FIG. 1B, the viewer will be able to ascertain a more accurate perception of the distance from the park bench 104 to the tree 106, and from the tree 106 to the building 108. Some combination of the viewer movements in direction 112 and direction 116 provides the viewer with a rotational view of the objects. For example, the viewer may travel far enough in a diagonal direction between directions 112 and 116 to "rotate around" and view the building 108 from its other side.

Figure 2A:
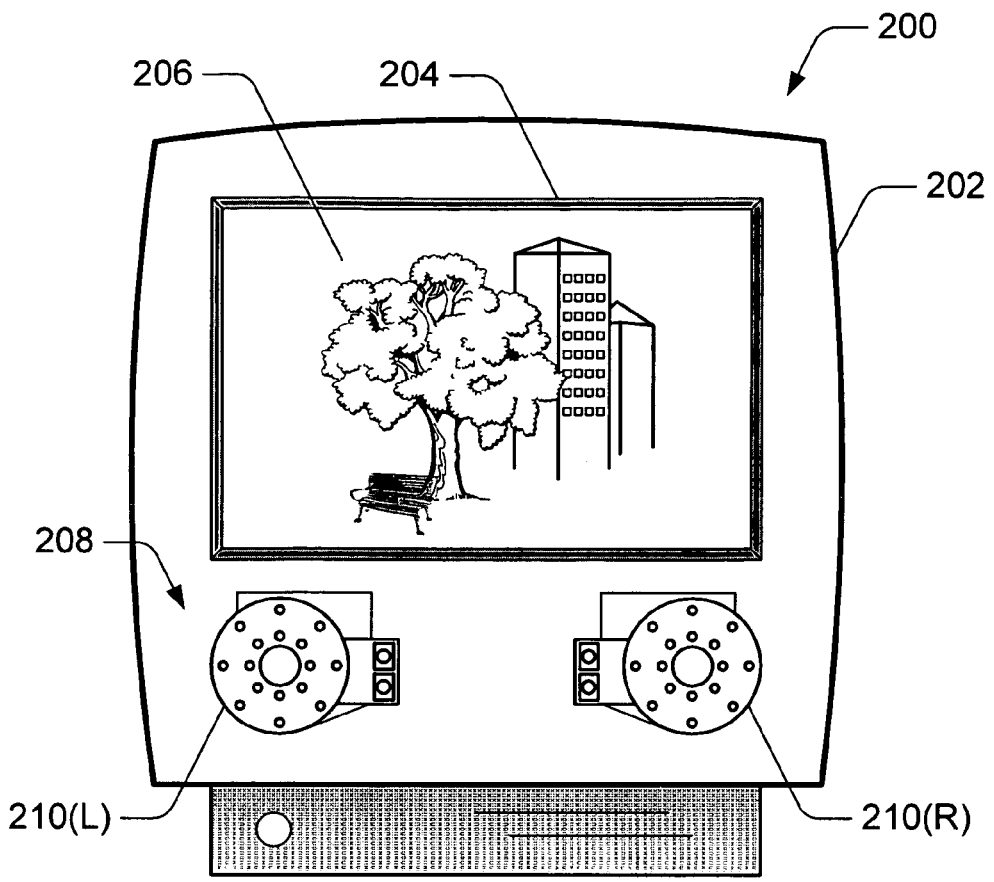
FIGS. 2A and 2B illustrate various components in an embodiment of a stereoscopic image display system.
Figure 2B:
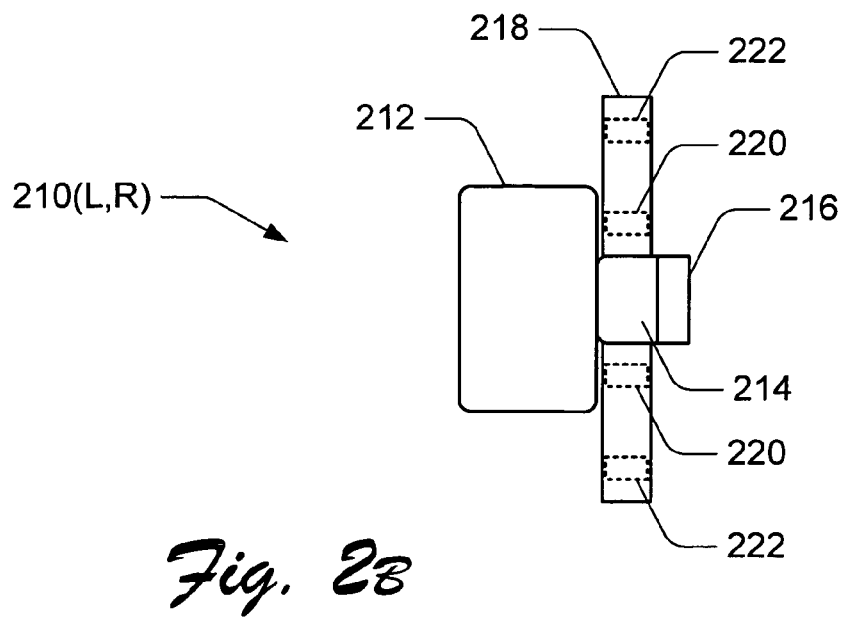

FIGS. 2A and 2B illustrate various components in an embodiment of a stereoscopic image display system 200. FIG. 2A illustrates a stereoscopic image display device 202 which includes display (or projection) components 204 to display an image 206 for stereoscopic viewing. The stereoscopic image display device 202 also includes an eye pupil acquisition system 208 in which camera systems 210(L) and 210(R) (e.g., camera systems left and right) capture images of the eye pupils of a viewer to determine a location of the eye pupils and to track positional changes of the eye pupils.

The stereoscopic image display device 202 may be implemented as any form of computing, electronic, and/or image rendering system with any number and combination of differing components as described below with reference to the computing device 1002 shown in FIG. 10. For example, the stereoscopic image display device 202 includes image generation logic that generates a sequential image (e.g., sequential to image 206) that corresponds to a positional change of the eye pupils of a viewer. The sequential image includes a motion parallax depiction of the image 206 for stereoscopic viewing. Additionally, the sequential image may also include a rotational depiction of the image 206 for stereoscopic viewing.

FIG. 2B further illustrates an example of camera systems 210(L) and 210(R). Each camera system 210 includes a camera 212, a camera lens 214, and an infra-red pass filter 216 over the camera lens 214. A camera system 210 also includes a support structure 218 for an inner ring of infra-red LEDs 220 (light emitting diodes) and an outer ring of infra-red LEDs 222. The inner ring of infra-red LEDs 220 is arranged, in relative terms, close to the camera lens 214 and the outer ring of infra-red LEDs 222 is arranged farther (relative to the inner ring of LEDs 220) from the camera lens 214.

The camera 212 can be implemented as a monochrome camera that captures images of the infra-red light reflected from a viewer and passed through the infra-red pass filter 216. The infra-red pass filter 216 blocks most visible light while permitting infra-red light to pass through. The two camera systems 210(L) and 210(R) are positioned below the display components 204 such that a camera lens 214 is tilted up towards the face of a viewer to reduce highlights, such as reflected light off glasses that may be worn by a viewer.

Figure 3A:
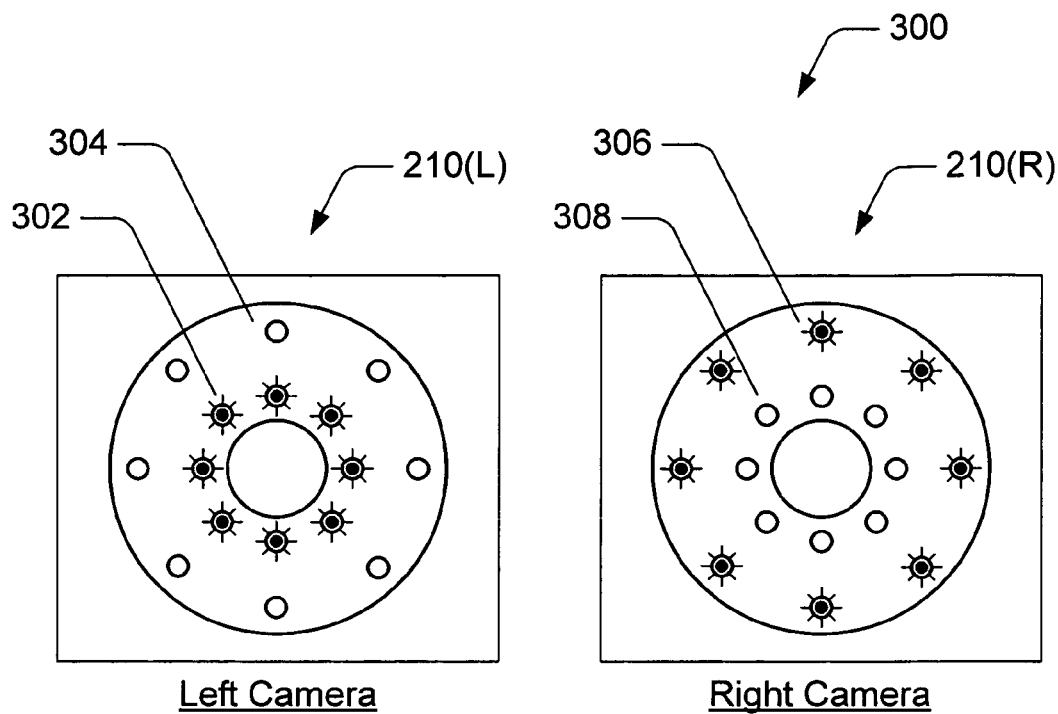
FIGS. 3A and 3B further illustrate components of the stereoscopic image display system shown in FIG. 2.
Figure 3B:
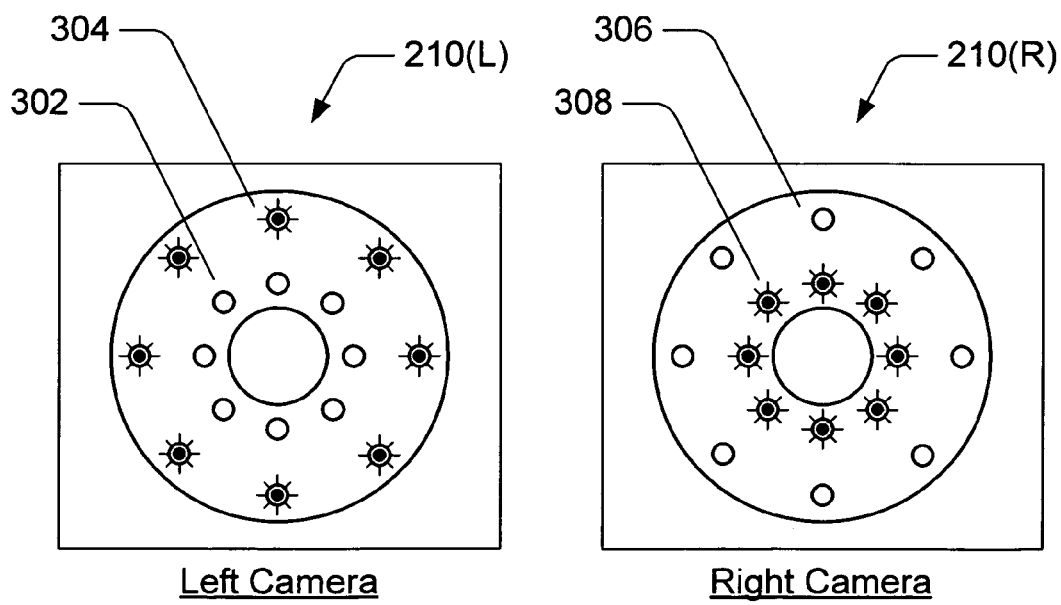

FIGS. 3A and 3B further illustrate the camera systems 210(L) and 210(R) of the eye pupil acquisition system 208 shown in FIGS. 2A and 2B, and an example 300 of eye pupil acquisition to determine and track a location of the eye pupils of a viewer. The eye pupils of a viewer are detected by alternately illuminating the viewer with the inner ring of infra-red LEDs 220 (FIG. 2) and the outer ring of infra-red LEDs 222 to cause the "red-eye" effect of the pupils. The "red-eye" effect is a retroreflection of the retina due to on-axis illumination of infra-red light when the light source is closely aligned with the eye pupils. The infra-red light that provides the on-axis illumination is referred to as an on-axis illumination source.

The inner ring of infra-red LEDs 220 of a camera system 210 is an on-axis illumination source that illuminates the eye pupils from which the infra-red light is retroreflected. The outer ring of infra-red LEDs 222 of a camera system 210 is an off-axis illumination source which illuminates the eyes of the viewer such that the eye pupils do not retroreflect the infra-red light. To detect a location of the eye pupils of a viewer, the on-axis and the off-axis illumination sources associated with the first camera system 210(L) are alternately illuminated in coordination with the illumination sources of the second camera system 210(R). The respective cameras 212 capture the images of the reflected infra-red light and alternately retroreflected infra-red light.

FIG. 3A illustrates that, at a particular time (e.g., T=t), an on-axis illumination source 302 of the left camera system 210(L) is illuminated and an off-axis illumination source 304 of the left camera system 210(L) is not illuminated. At the same time, an off-axis illumination source 306 of the right camera system 210(R) is illuminated and an on-axis illumination source 308 of the right camera system 210(R) is not illuminated. Thus, there is a simultaneous retroreflection for the left camera with no retroreflection for the right camera. Each of the respective cameras 212 capture the images of the reflected infra-red light to form a set of images (e.g., photos) at the particular time. A left camera image will include the retroreflected infra-red light from the illuminated on-axis illumination source 302 which is reflected from the eye pupils.

FIG. 3B illustrates that, at the particular time plus a time duration (e.g., T=t+1), the on-axis illumination source 302 of the left camera system 210(L) is not illuminated and the off-axis illumination source 304 of the left camera system 210(L) is illuminated. At the same time, the off-axis illumination source 306 of the right camera system 210(R) is not illuminated and the on-axis illumination source 308 of the right camera system 210(R) is illuminated. Thus, there is a simultaneous retroreflection for the right camera with no retroreflection for the left camera. Each of the respective cameras 212 capture the images of the reflected infra-red light to form another set of images at the particular time plus the time duration. A right camera image will include the retroreflected infra-red light from the illuminated on-axis illumination source 308 which is reflected from the eye pupils.

The reversed on-off state of the on-axis illumination sources and the off-axis illumination sources for the two respective camera systems 210(L) and 210(R) minimize the changes in intensity of the infra-red reflection from a viewer's face. The image sets captured with each left and right camera at the particular time (T=t), and at the particular time plus a time duration (T=t+1), can be compared to determine the location of the eye pupils. Objects other than the eye pupils (e.g., other facial features of a viewer) appear similar in the image sets because the reflection is nearly similar due to the small difference in illumination angles of the illumination sources that produce the same illumination energy. To detect the eye pupils, the difference between the intensity distributions of the first image set captured with the cameras and the subsequent image set captured with the cameras can be determined. The eye pupils are imaged as elliptical bright spots on the images when illuminated with the respective on-axis illumination sources. The eye pupils can be further identified in the captured images based on a range of eye pupil sizes, such as between three and five or six millimeters, for example.

False positives in the image sets are reduced, or eliminated, by comparison between the image sets. Further, epipolar geometry can be implemented to verify the 2D locations of the eye pupils as captured in the two image sets with the respective cameras. Projective epipolar geometry describes a relation that exists between two images such that a point in one image lies on a line which is a projection of a 3D ray passing through the corresponding point in a second image. Epipolar geometry satisfies location constraints based on the relative camera positions in the camera systems 210(L) and 210(R). In addition, camera parameters can be utilized to triangulate the location of the eye pupils in both camera image sets to compute their 3D locations relative to the cameras.

These 3D locations are used to servo positional motors that can move the display components 204 to a position that allows for stereoscopic viewing.

The eye pupil acquisition system 208 determines and tracks the location of a viewer's eye pupils without a user attachable device such that positional feedback is determined directly from the movement of the viewer's eyes, and not from a device attached to the viewer. The eye pupil acquisition system 208 can be implemented to track a horizontal, vertical, and/or rotational positional change of the eye pupils of a viewer.

Figure 4:
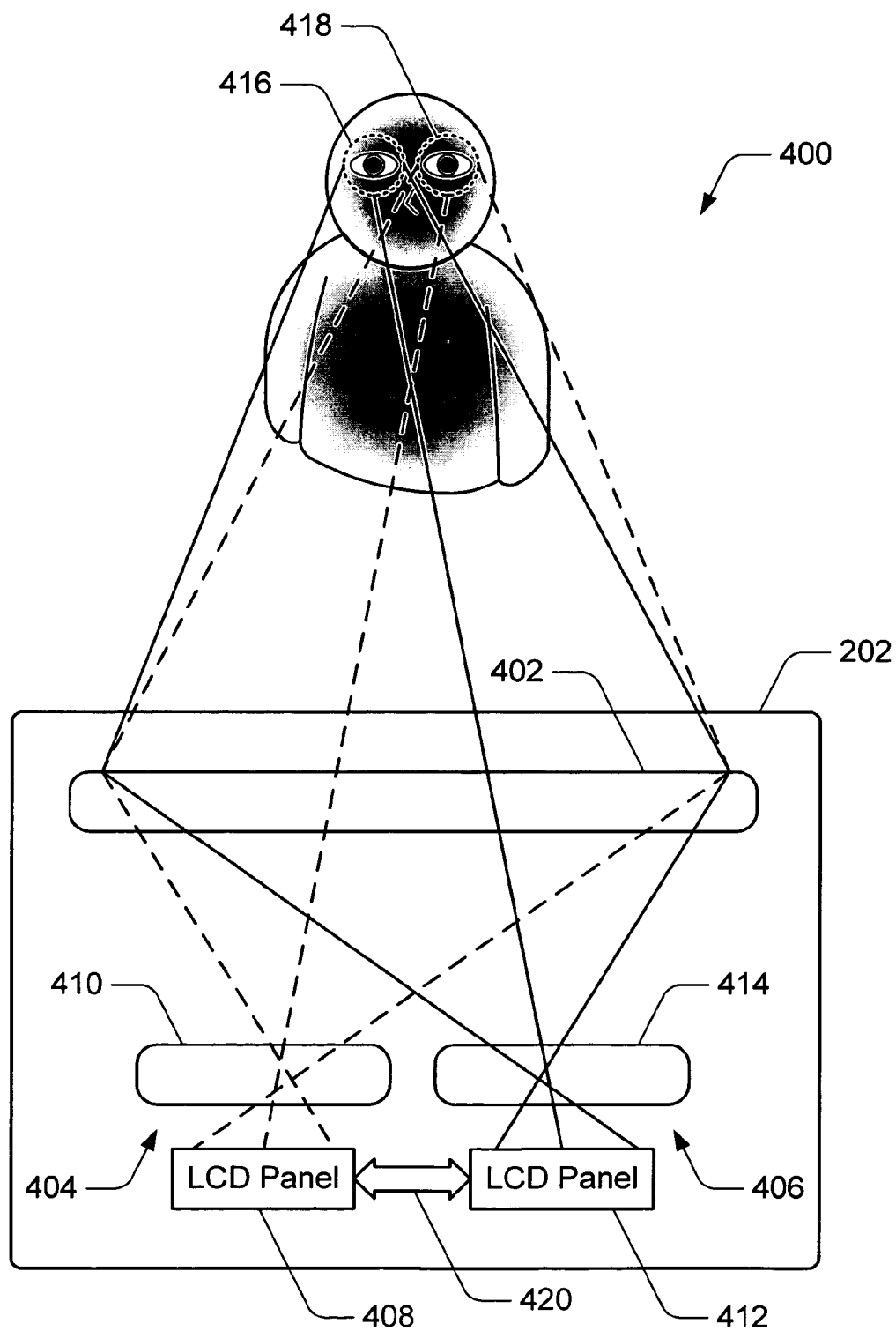
FIG. 4 illustrates an optical assembly of the stereoscopic image display system shown in FIG. 2.

FIG. 4 illustrates various components of an optical assembly 400 of the stereoscopic image display device 202 shown in FIG. 2A. The optical assembly 400 includes a display lens 402, a first display system 404, and a second display system 406. Display system 404 includes a display device 408 and a projection lens 410. Similarly, display system 406 includes a display device 412 and a projection lens 414. The display devices 408 and 412 can be implemented as LCD display panels, one each to display an image for viewing with a left eye of a viewer and to display the image for viewing with a right eye of a viewer.

In an embodiment, the display lens 402 can be implemented as a Fresnel lens which projects the image of the first LCD display panel 408 within a focus 416 for viewing with the right eye of the viewer, and projects the image of the second LCD display panel 412 within a focus 418 for viewing with the left eye of the viewer. The Fresnel lens 402 projects the focuses 416 and 418 of the respective projection lenses 414 and 410 into the entrance eye pupils of the viewer.

The aperture of the projection lenses 410 and 414 is such that the exit pupil images (i.e., focus 416 and focus 418) are somewhat larger than the entrance pupil of the eyes of the viewer. For example, for a 50 mm projection lens having f/1.2 optics, the lens exit pupil would be approximately 40 mm (i.e., 50 mm/1.2). Because a normally adapted human eye has an approximate 3 mm pupil diameter, the approximate 40 mm projection of focus 416 and focus 418 yields a viewing zone in which the viewer can view the image as a stereoscopic display without undue difficulty in head motion control. In this example, the viewer can be positioned approximately two feet from the display device 202 and can view an image much like viewing a traditional computer display.

Components of the optical assembly 400 can be pivoted, translated, and/or otherwise repositioned with a servo control system 420 to track positional changes of the eye pupils of the viewer. Further, the components of the optical assembly 400 can be repositioned to account for an, interocular distance between the eyes of the viewer such that focus 416 and focus 418 are positioned for stereoscopic viewing by the viewer. Although not shown, the optical assembly 400 may be implemented with any number of other optical components, such as with the use of mirrors rather than a Fresnel lens.

The eye pupil acquisition system 208 can also be implemented to calibrate the position of the eye pupils of the viewer relative to the display components 204 such that the images are projected for stereoscopic viewing by a particular viewer. Initially, a viewer adjusts his or her position until the left and right images can be clearly seen within each respective focus 418 and focus 416. The infra-red reflective images (e.g., photos) are then captured with cameras of the camera systems 210(L) and 210(R). The captured images are then used to compute the 3D positions of the eye pupils relative to the camera systems, and these computed 3D positions can be stored in a lookup table.

When the eye pupil acquisition system 208 is tracking positional changes of the eye pupils, the computed 3D positions of the eye pupils can be compared against the lookup table to find the closest relative position in the lookup table. The display components 204 can then be repositioned to minimize the average distance between the current eye pupil 3D locations and the closest points in the lookup table. Alternatively, or in addition, several points in the lookup table can be averaged to determine an optimal average position based on the position of the eye pupils.

Methods for stereoscopic image display, such as exemplary methods 500, 600, and 900 described with reference to FIGS. 5, 6, and 9 respectively, may be described in the general context of computer executable instructions. Generally, computer executable instructions include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
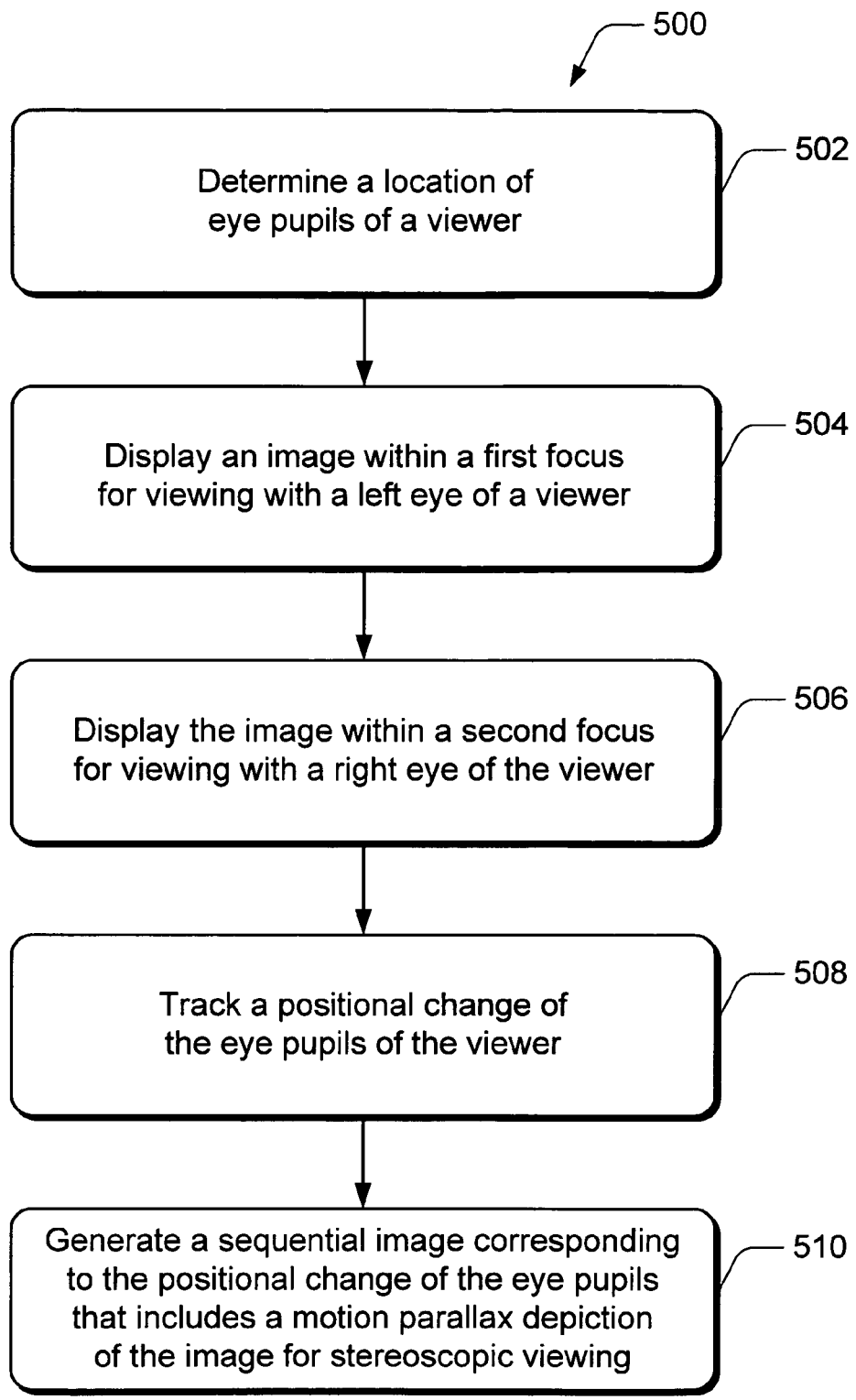
FIG. 5 is a flow diagram that illustrates an exemplary method for the stereoscopic image display system shown in FIG. 2.

FIG. 5 illustrates an exemplary method 500 for the stereoscopic image display system described with reference to FIGS. 2-4. The order in which the method is described is not intended to be construed as a limitation, and any number of the described method blocks can be combined in any order to implement the method. Furthermore, the method can be implemented in any suitable hardware, software, firmware, or combination thereof.

At block 502, a location of eye pupils of a viewer is determined. For example, the eye pupil acquisition system 208 (FIG. 2) determines a location of the eye pupils of a viewer without a user attachable device. At block 504, an image is displayed within a first focus for viewing with a left eye of a viewer. For example, an image is displayed on the display device 408 (FIG. 4) and the image is projected by projection lens 410 through the display lens 402 for viewing within focus 418 with the left eye of the viewer. Similarly, the image is displayed within a second focus for viewing with a right eye of the viewer at block 506. For example, the image is displayed on the display device 412 and the image is projected by projection lens 414 through the display lens 402 for viewing within focus 416 with the right eye of the viewer. In an embodiment, the image is displayed within the first focus at block 504 and displayed within the second focus at block 506 for approximate simultaneous viewing with the left eye and the right eye of the viewer, respectively.

At block 508, a positional change of the eye pupils of the viewer is tracked. For example, the eye pupil acquisition system 208 (FIG. 2) can track a horizontal, vertical, and/or rotational positional change of the eye pupils of the viewer. At block 510, a sequential image is generated corresponding to the positional change of the eye pupils where the sequential image includes a motion parallax depiction of the image for stereoscopic viewing. The sequential image may also be generated to include a rotational depiction of the image for stereoscopic viewing.

Figure 6:
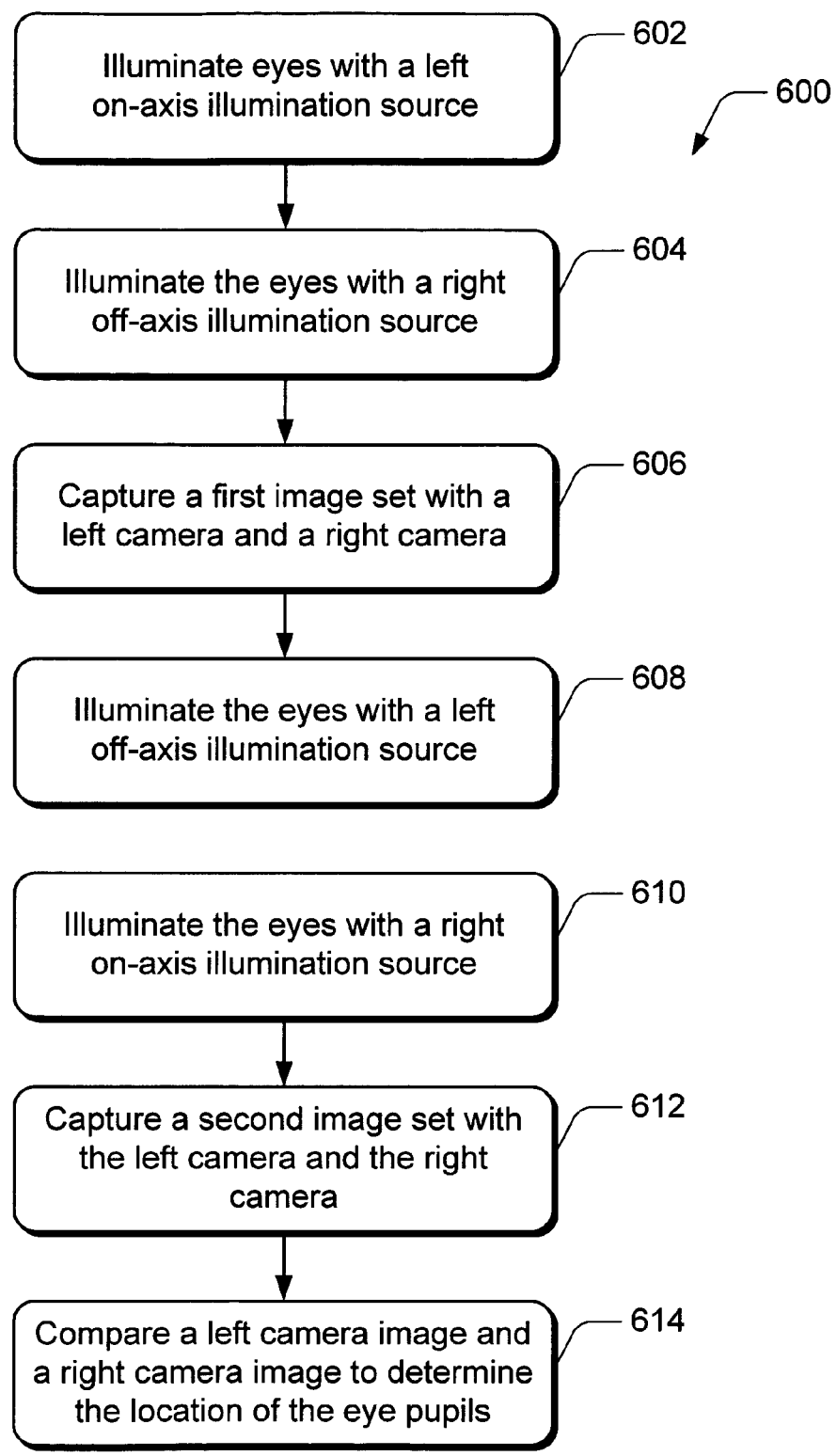
FIG. 6 is a flow diagram that illustrates an exemplary method for a pupil tracking system as shown in FIGS. 2 and 3.

FIG. 6 illustrates an exemplary method 600 for the stereoscopic image display system described with reference to FIGS. 2-4. The order in which the method is described is not intended to be construed as a limitation, and any number of the described method blocks can be combined in any order to implement the method. Furthermore, the method can be implemented in any suitable hardware, software, firmware, or combination thereof.

At block 602, eyes are illuminated with a left on-axis illumination source such that eye pupils retroreflect infra-red light from the left on-axis illumination source. For example, the on-axis illumination source 302 (FIG. 3A) of the left camera system 210(L) illuminates the eyes of a viewer such that the eye pupils retroreflect the infra-red light. At block 604, the eyes are illuminated with a right off-axis illumination source such that the eye pupils do not retroreflect infra-red light from the right off-axis illumination source. For example, the off-axis illumination source 306 of the right camera system 210(R) illuminates the eyes of the viewer such that the eye pupils do not retroreflect the infra-red light. In an embodiment, the eyes are illuminated at block 602 and at block 604 approximately simultaneously.

At block 606, a first image set is captured with a left camera and a right camera where a left camera image includes retroreflected infra-red light which corresponds to a location of the eye pupils. For example, a left camera image will include the retroreflected infra-red light from the on-axis illumination source 302 of the left camera system 210(L).

At block 608, the eyes are illuminated with a left off-axis illumination source such that the eye pupils do not retroreflect infra-red light from the left off-axis illumination source. For example, the off-axis illumination source 304 (FIG. 3B) of the left camera system 210(L) illuminates the eyes of the viewer such that the eye pupils do not retroreflect the infra-red light. At block 610, the eyes are illuminated with a right on-axis illumination source such that the eye pupils retroreflect infra-red light from the right on-axis illumination source. For example, the on-axis illumination source 308 of the right camera system 210(R) illuminates the eyes of the viewer such that the eye pupils retroreflect the infra-red light. In an embodiment, the eyes are illuminated at block 608 and at block 610 approximately simultaneously.

At block 612, a second image set is captured with the left camera and the right camera where a right camera image includes retroreflected infra-red light which corresponds to the location of the eye pupils. For example, a right camera image will include the retroreflected infra-red light from the on-axis illumination source 308 of the right camera system 210(R). At block 614, a left camera image and a right camera image are compared to determine the location of the eye pupils.

Figure 7:
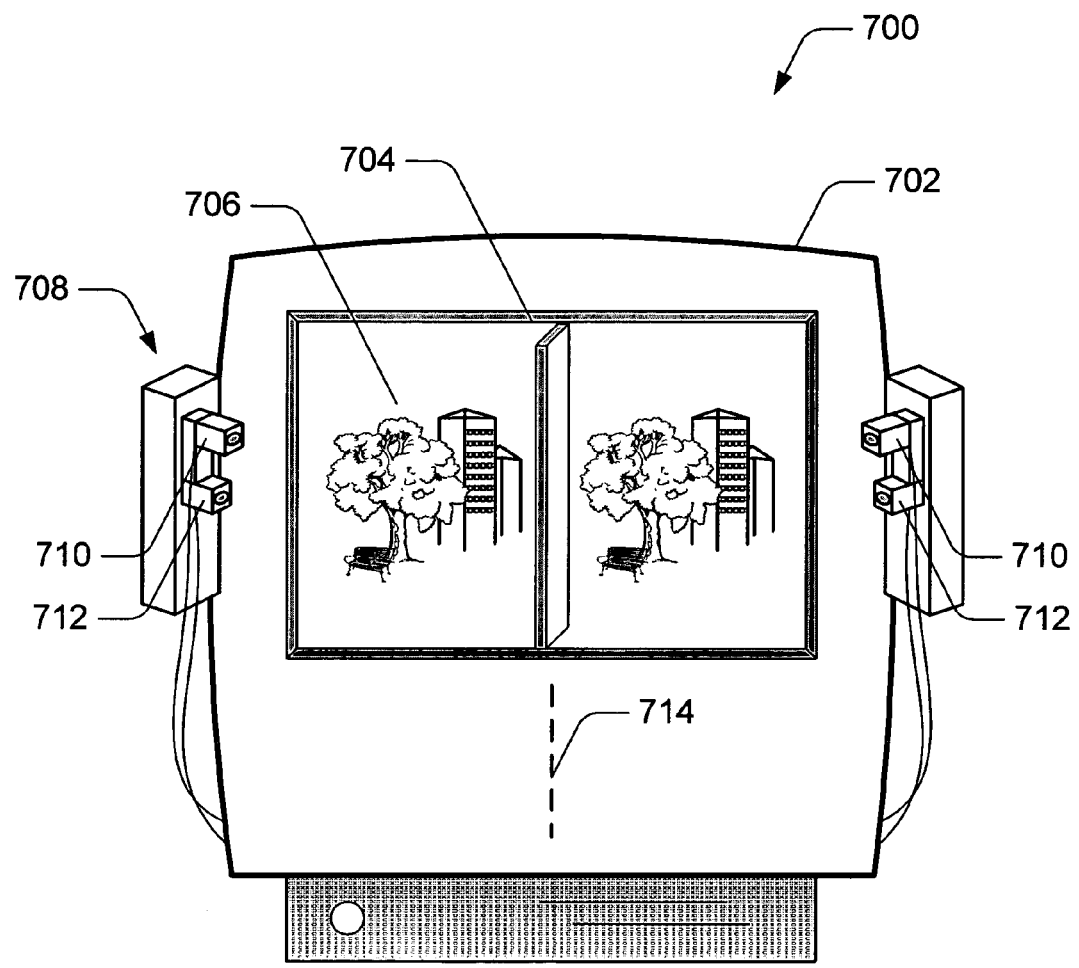
FIG. 7 illustrates various components in another embodiment of a stereoscopic image display system.

FIG. 7 illustrates various components in an embodiment of a stereoscopic image display system 700. A stereoscopic image display device 702 includes display (or projection) components 704 to display an image 706 for stereoscopic viewing. The stereoscopic image display device 702 also includes a head position determination system 708 in which long-range infra-red sensors 710 and short-range infra-red sensors 712 determine a head position of a viewer relative to a center 714 of the of the display components 704. The short-range infra-red sensors 712 can be implemented to more precisely determine the viewer's head position after and/or in conjunction with the long-range infra-red sensors 710.

The head position determination system 708 also tracks positional changes of the viewer's head when viewing the stereoscopic image display, and does so without feedback or cues from a user attachable device. For example, the infra-red range sensors 710 and 712 are positioned, or mounted on the stereoscopic image display device 702, to track a horizontal positional change of a viewer's head. Although not shown specifically, the infra-red range sensors 710 and 712 can be positioned, or otherwise implemented, to also track a vertical or rotational positional change of the viewer's head.

The stereoscopic image display device 702 may be implemented as any form of computing, electronic, and/or image rendering system with any number and combination of differing components as described below with reference to the computing device 1002 shown in FIG. 10. For example, the stereoscopic image display device 702 includes viewer position logic to initiate centering the display components 704 in front of the viewer and relative to the head position of the viewer according to the infra-red range sensors 710 and 712.

Further, the stereoscopic image display device 702 also includes image generation logic that generates a sequential image (e.g., sequential to image 706) that corresponds to a positional change of the viewer's head. The sequential image includes a motion parallax depiction of the image 706 for stereoscopic viewing. Additionally, the sequential image may also include a rotational depiction of the image 706 for stereoscopic viewing.

Figure 8:
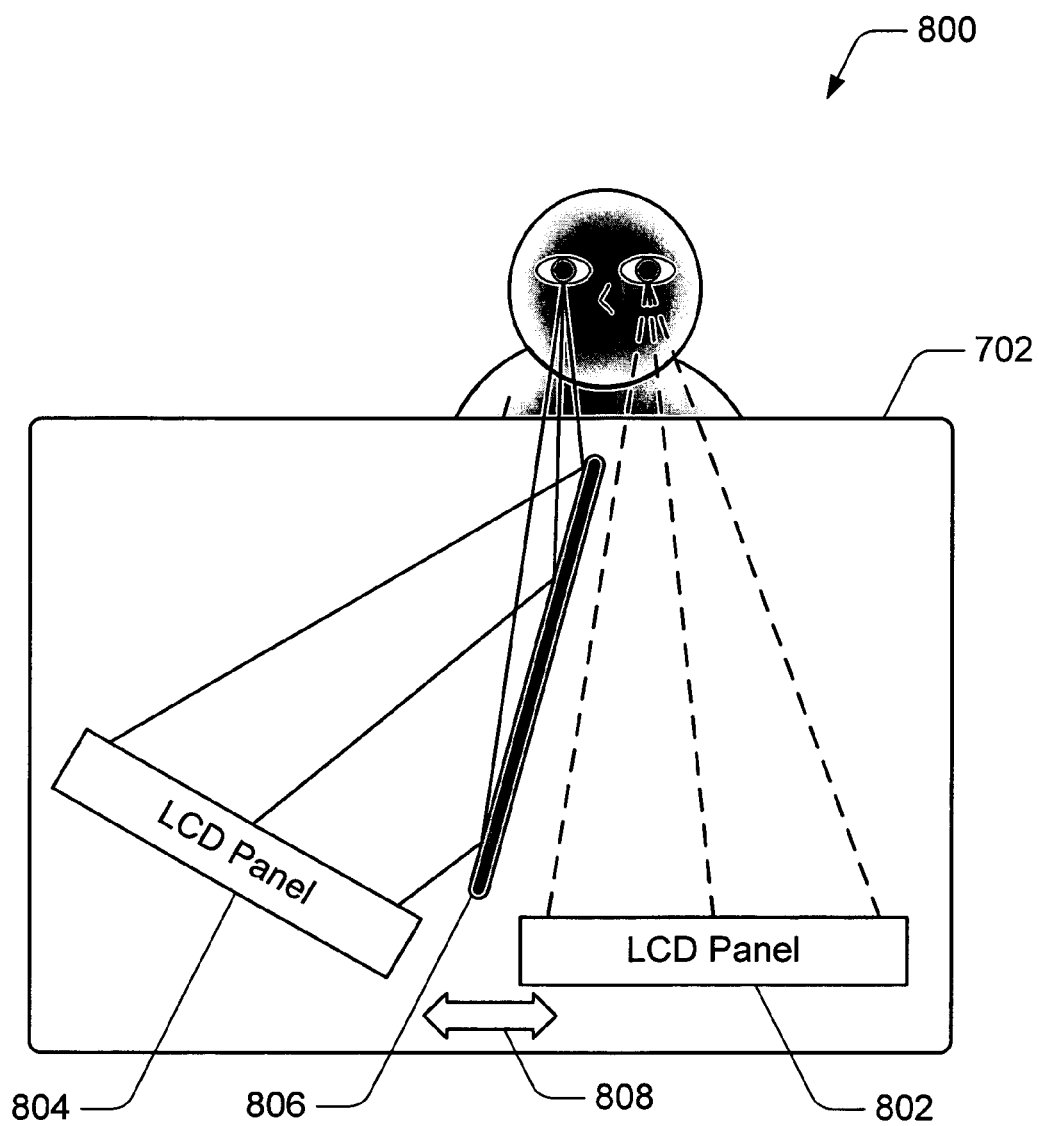
FIG. 8 illustrates an optical assembly of the stereoscopic image display system shown in FIG. 7.

FIG. 8 illustrates various components of an optical assembly 800 of the stereoscopic image display device 702 shown in FIG. 7. The optical assembly 800 includes a first display device 802 to display an image for viewing with a left eye of a viewer, a second display device 804 to display the image for viewing with a right eye of the viewer, and a mirror 806 to reflect the image displayed for viewing on display device 804. The display devices 802 and 804 can be implemented as LCD display panels, one each to display an image for viewing with the left eye of the viewer and to display the image for viewing with the right eye of the viewer.

The image displayed on display device 804 for the viewer's right eye is reverted left to right so that upon reflection from the mirror 806, the viewer's right eye will see the same image orientation as the left eye. Additionally, the optical assembly 800 of the stereoscopic image display device 702 is a direct view system with no intervening optics between the LCD display panels 802 and 804 and the viewer's eyes. The positioning of the components of optical assembly 800 are merely illustrative and can be implemented in varying configurations. For example, display panel 804 can be positioned at a right angle to display panel 802 with the mirror 806 positioned at a forty-five degree angle to both of the display panels.

The components of the optical assembly 800 can be pivoted, translated, and/or otherwise repositioned with a servo control system 808 to track positional changes of the viewer's head as determined by the head position determination system 708 (FIG. 7). In this example, a positional change of the viewer's head along a horizontal direction is detected by the infra-red range sensors 710 and 712, and the optical assembly 800 is repositioned in front of the viewer and relative to the head position of the viewer. The motion of the viewer's positional change is also detected to control the viewpoint of the image being displayed.

Figure 9:
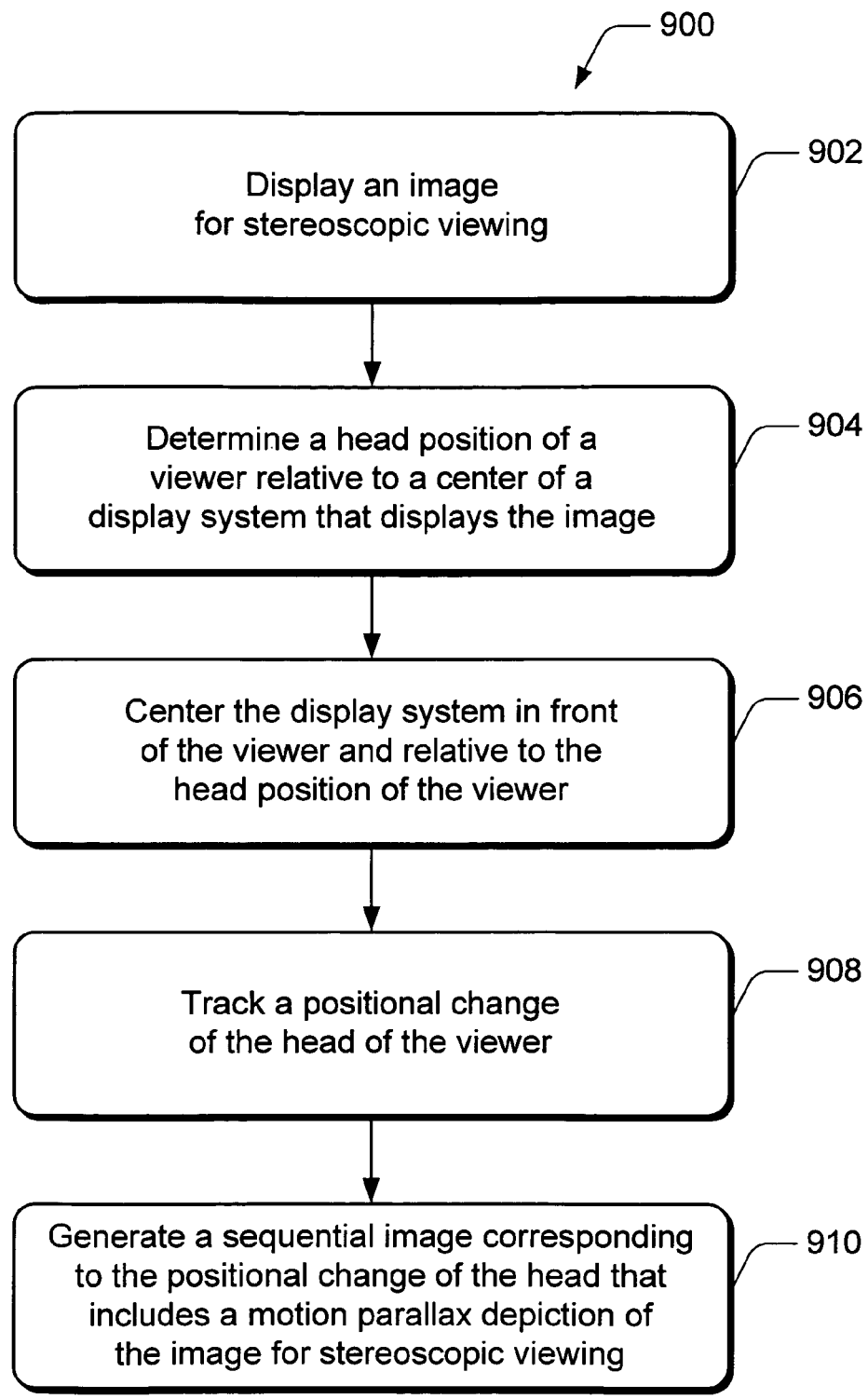
FIG. 9 is a flow diagram that illustrates an exemplary method for the stereoscopic image display system shown in FIG. 7.

FIG. 9 illustrates an exemplary method 900 for the stereoscopic image display system described with reference to FIGS. 7 and 8. The order in which the method is described is not intended to be construed as a limitation, and any number of the described method blocks can be combined in any order to implement the method. Furthermore, the method can be implemented in any suitable hardware, software, firmware, or combination thereof.

At block 902, an image is displayed for stereoscopic viewing. For example, an image 706 (FIG. 7) is displayed on the first display device 802 for viewing with a left eye of the viewer, and the image is displayed on the second display device 804 for viewing with the right eye of the viewer such that the image displayed on the second display device 804 is reflected for viewing with mirror 806. At block 904, a head position of the viewer is determined relative to a center of a display system that displays the image. For example, a position of the viewer's head is determined with the infra-red range sensors 710 and 712 of the head position determination system 708.

At block 906, the display system is centered in front of the viewer and relative to the head position of the viewer. For example, the servo control system 808 centers the optical assembly 800 in front of the viewer and relative to the head position of the viewer according to the infra-red range sensors 710 and 712. At block 908, a positional change of the head of the viewer is tracked. For example, the head position determination system 708 tracks a horizontal, vertical, and/or rotational positional change of the viewer's head.

At block 910, a sequential image is generated that corresponds to the positional change of the head where the sequential image includes a motion parallax depiction of the image for stereoscopic viewing. The sequential image may also be generated to include a rotational depiction of the image for stereoscopic viewing.

Figure 10:
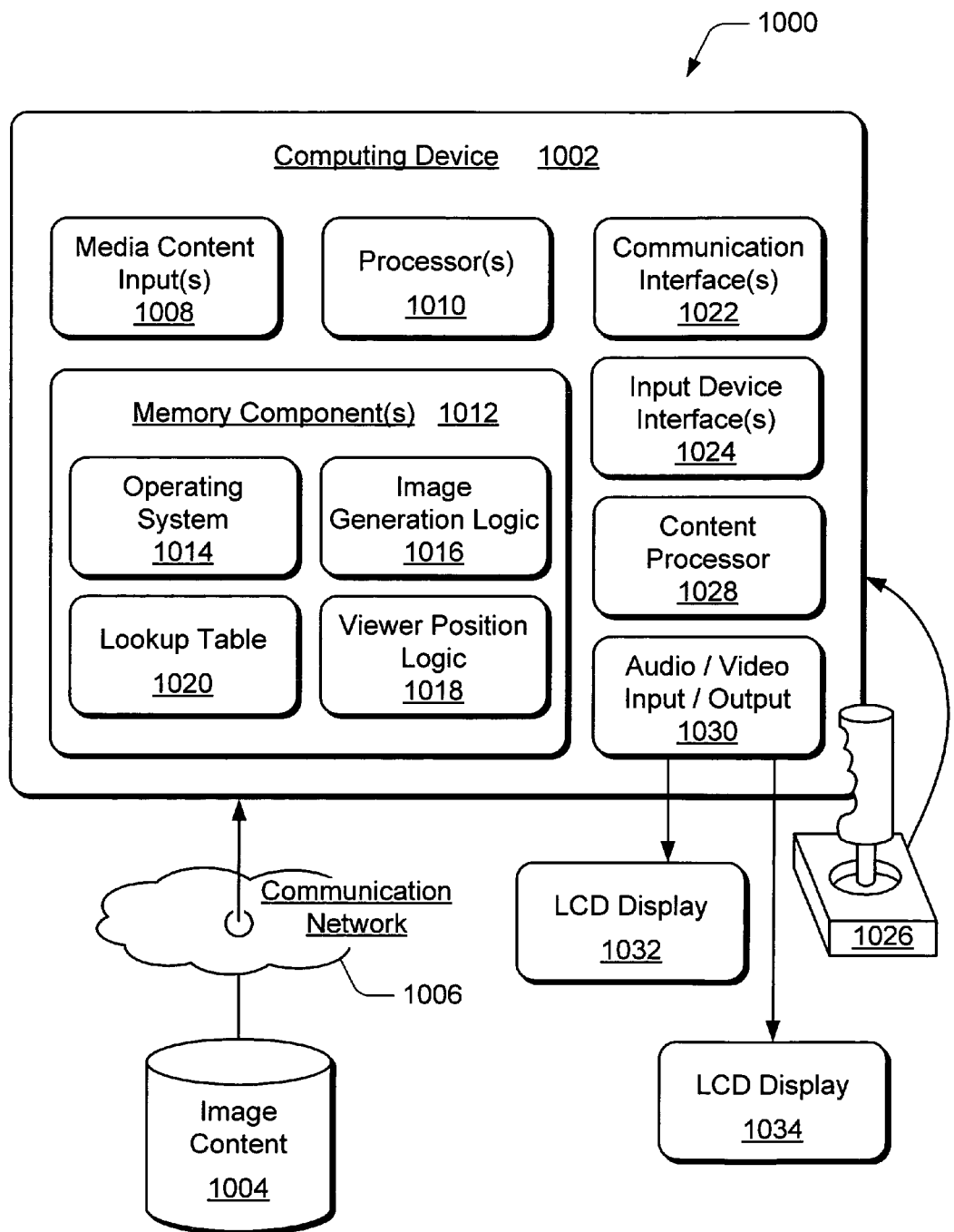
FIG. 10 illustrates various components of an exemplary computing device that can be implemented as a stereoscopic image display device, such as in the stereoscopic image display systems shown in FIG. 2 and FIG. 7.

FIG. 10 illustrates various components of an exemplary computing system 1000 that can be implemented in a stereoscopic image display system, such as in the stereoscopic image display systems 200 and 700 described with reference to FIGS. 2 and 7, respectively. The computing system 1000 includes a computing device 1002 which can be implemented in any number of embodiments with numerous other general purpose or special purpose computing system environments or configurations. Examples of well known computing systems, environments, and/or configurations that may be implemented in the exemplary computing system 1000 include, but are not limited to, personal computers, hand-held or laptop devices, multiprocessor systems, microprocessor-based systems, set-top boxes, programmable consumer electronics, network PCs, gaming consoles, distributed computing environments that include any of the above systems or devices, and the like.

Computing system 1000 includes remote image content 1004 which can be received via a communication network 1006. The image content 1004 is stored for display as image 206 on the display components 204 of the stereoscopic image display device 202 (FIG. 2), and for display as image 706 on the display components 704 of the stereoscopic image display device 702 (FIG. 7). The image content 1004 can include any combination of video, still images, and interpolated synthetic images captured and/or generated to form dynamic scenes for display as a stereoscopic image display.

In the examples of stereoscopic image display described with reference to the stereoscopic image display systems 200 and 700, the image content 1004 is pre-rendered as video based on the current eye pupil location or head position of a viewer and changes to correspond to positional changes of the viewer. Although the computing device 1002 and the image content 1004 are illustrated and described as separate and/or remote components of the computing system 1000, the computing device 1002 may contain the image content 1004 in an integrated memory component.

Communication network 1006 can be implemented as any data communication medium, Internet protocol (IP) connection, or communication system having any protocol and/or messaging format. For example, the communication network 1006 can be implemented as a local area network (LAN), a wide area network (WAN), a public network such as the Internet, and/or any combination thereof. Although not shown, communication between devices in the computing system 1000 can also be facilitated via a cable network, radio frequency signal, over-air broadcast, satellite transmission, and the like.

The computing device 1002 includes one or more media content inputs 1008 which may include Internet Protocol (IP) inputs over which streams of media content (e.g., image content 1004) are received via an IP-based network (e.g., communication network 1006). The computing device 1002 also includes one or more processors 1010 (e.g., any of microprocessors, controllers, and the like) which process various instructions to control the operation of computing device 1002 and to communicate with other electronic and computing devices.

The computing device 1002 can be implemented with one or more memory components 1012, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. The memory components 1012 provide data storage mechanisms to store various information and/or data such as received media content, software applications, and any other types of information and data related to operational aspects of computing device 1002.

An operating system 1014, image generation logic 1016, and viewer position logic 1018 can all be maintained as software applications with non-volatile memory components 1012 and executed on processor(s) 1010 to implement embodiments of stereoscopic image display. As described above with reference to the stereoscopic image display systems 200 and 700, the image generation logic generates a sequential image that corresponds to a positional change of the of the eye pupils of a viewer, or a positional change of a viewer's head. The sequential image includes a motion parallax depiction of the current image for stereoscopic viewing, and may also include a rotational depiction of the current image. The viewer position logic 1018 initiates centering the display components 704 (FIG. 7) in front of the viewer and relative to the head position of the viewer according to the infra-red range sensors 710 and 712 of the head position determination system 708.

Although the image generation logic 1016 and the viewer position logic 1018 are each illustrated and described as a single application, each can be implemented as several component applications distributed to each perform one or more functions in the exemplary computing system 1000. Further, the image generation logic 1016 and/or the viewer position logic 1018 may be implemented on a device other than the computing device 1002, where the other device may also be configured for communication with computing device 1002 in the computing system 1000.

As used herein, the term "logic" (e.g., the image generation logic 1016 and/or the viewer position logic 1018) can also refer to hardware, firmware, software, or any combination thereof that may be implemented to perform the logical operations associated with the embodiments of stereoscopic image display. Logic may also include any supporting circuitry utilized to complete a given task including supportive analog operations. For example, logic may also include analog circuitry, memory components, input/output (I/O) circuitry, interface circuitry, power providing/regulating circuitry, and the like. A lookup table 1020 is also maintained with the non-volatile memory components 1012. As described above with reference to calibration of the eye pupil acquisition system 208, the lookup table 1020 maintains optimal eye pupil positions for different viewers of the stereoscopic image display device 202.

The computing device 1002 further includes communication interface(s) 1022 and input device interfaces 1024 which can be implemented as any one or more of a serial and/or parallel interface, a wireless interface, any type of network interface, and as any other type of communication interface. A wireless interface enables computing device 1002 to receive control input commands and other information from an input device, such as from a remote control device or from another infrared (IR), 802.11, Bluetooth, or similar RF input device. An input device interface 1024 provides an interface for a joystick controller 1026 that can be used in conjunction with a viewer positional tracking system to pan within a stereoscopic image, such as to rotate around behind an object.

A network interface provides a connection between computing device 1002 and the communication network 1006 by which the other electronic and computing devices. Similarly, a serial and/or parallel interface provides a data communication path directly between computing device 1002 and the other electronic or computing devices. A modem facilitates computing device 1002 communication with the other electronic and computing devices via a conventional telephone line, a DSL connection, cable, and/or other type of connection. Although not shown, computing device 1002 may also include user and other input devices such as a keyboard, mouse, pointing device, and/or other mechanisms to interact with, and to input information to computing device 1002.

Computing device 1002 also includes a content processor 1028 which can include a video decoder and/or additional processors to receive, process, and decode media content, image content, and display data. Computing device 1002 also includes audio and/or video input/outputs 1030 that provides audio and/or video to an audio rendering and/or display devices 1032 and 1034, or to other devices that process, display, and/or otherwise render audio, video, and display data. Video signals and audio signals can be communicated from computing device 1002 to the display devices 1032 and 1034 via an RF (radio frequency) link, S-video link, composite video link, component video link, analog audio connection, or other similar communication links.

Although shown separately, some of the components of computing device 1002 may be implemented in an application specific integrated circuit (ASIC). Additionally, a system bus (not shown) typically connects the various components within computing device 1002. A system bus can be implemented as one or more of any of several types of bus structures, including a memory bus or memory controller, a peripheral bus, an accelerated graphics port, or a local bus using any of a variety of bus architectures.

Although embodiments of stereoscopic image display have been described in language specific to structural features and/or methods, it is to be understood that the subject of the appended claims is not necessarily limited to the specific features or methods described. Rather, the specific features and methods are disclosed as exemplary implementations of stereoscopic image displays.

The invention claimed is:

1. A stereoscopic image display system, comprising:
    an eye pupil acquisition system configured to detect eye pupils of a viewer to determine a three-dimensional (3D) location of a left eye pupil relative to a first display system and a 3D location of a right eye pupil relative to a second display system based at least in part on infrared light reflected from the eye pupils of the viewer, the eye pupil acquisition system further configured to track a positional change of the eye pupils;
    the first display system configured to display an image for viewing with a left eye of the viewer;
    the second display system configured to display the image for viewing with a right eye of the viewer;
    image generation logic configured to generate a sequential image corresponding to the positional change of the eye pupils, the sequential image including a motion parallax depiction of the image for stereoscopic viewing; and
    a control system in communication with the eye pupil acquisition system and operably coupled to the first and second display systems and being configured to, responsive to the determined 3D locations of the eye pupils, reposition components of the first and second display systems to:
        track the positional change of the eye pupils; and
        for stereoscopic viewing of the sequential image, in response to the positional change:
            focus a first projection of the image to within a first focus at the 3D location of the left eye pupil of the left eye of the viewer; and
            focus a second projection of the image to within a second focus at the 3D location of the right eye pupil of the right eye of the viewer.

2. A stereoscopic image display system as recited in claim 1, wherein the image generation logic is further configured to generate the sequential image to include a rotational depiction of the image for stereoscopic viewing.

3. A stereoscopic image display system as recited in claim 1, wherein the eye pupil acquisition system is further configured to determine the 3D location of the eye pupils without a user attachable device.

4. A stereoscopic image display system as recited in claim 1, wherein the eye pupil acquisition system is further configured to track a horizontal positional change of the eye pupils.

5. A stereoscopic image display system as recited in claim 1, wherein the eye pupil acquisition system is further configured to track a vertical positional change of the eye pupils.

6. A stereoscopic image display system as recited in claim 1, wherein the eye pupil acquisition system is further configured to track a rotational positional change of the eye pupils.

7. A stereoscopic image display system as recited in claim 1, wherein:
    the first display system is further configured to display the image within the first focus for viewing with the left eye of the viewer; and
    the second display system is further configured to display the image within the second focus for viewing with the right eye of the viewer.

8. A stereoscopic image display system as recited in claim 1, further comprising a display lens configured to display the image from the first display system and from the second display system for stereoscopic viewing.

9. A stereoscopic image display system as recited in claim 1, further comprising a Fresnel lens configured to display the image from the first display system and from the second display system for stereoscopic viewing.

10. A stereoscopic image display system as recited in claim 1, further comprising a display lens configured to project the image from the first display system within the first focus for viewing with the left eye of the viewer, and project the image from the second display system within the second focus for viewing with the right eye of the viewer.

11. A stereoscopic image display system as recited in claim 1, further comprising a Fresnel lens configured to project the image from the first display system within the first focus for viewing with the left eye of the viewer, and project the image from the second display system within the second focus for viewing with the right eye of the viewer.

12. A stereoscopic image display system as recited in claim 1, further comprising a display lens configured to display the image from the first display system and from the second display system for stereoscopic viewing, and wherein:
  the first display system includes a first display device and a first projection lens to project the image from the first display device through the display lens;
  the second display system includes a second display device and a second projection lens to project the image from the second display device through the display lens; and
  the display lens projects the image from the first display device for viewing with the left eye of the viewer, and projects the image from the second display device for viewing with the right eye of the viewer.

13. A stereoscopic image display system as recited in claim 1, wherein the eye pupil acquisition system includes:
  a left camera configured to image the infra-red light reflected from the eye pupils, the left camera including a left on-axis illumination source and a left off-axis illumination source, the left on-axis illumination source and the left off-axis illumination source each configured to alternately illuminate the eyes of the viewer;
  a right camera configured to image the infra-red light reflected from the eye pupils, the right camera including a right on-axis illumination source and a right off-axis illumination source, the right on-axis illumination source and the right off-axis illumination source each configured to alternately illuminate the eyes of the viewer; and
  viewer position logic configured to compare left camera images and right camera images that include the alternate illumination of the eyes of the viewer to determine the location of the eye pupils.

14. A method comprising:
  detecting a right eye pupil and a left eye pupil of eye pupils of a viewer based on infra-red light reflected from the eye pupils of the viewer;
  determining, based at least in part on the detecting, a three-dimensional (3D) location of the right eye pupil relative to a first display system and a 3D location of the left eye pupil relative to a second display system;
  determining a first focus based on the determined 3D location of the left eye pupil;
  displaying, by the first display system, an image within the first focus at the 3D location of the left eye pupil for viewing with a left eye of the viewer;
  determining a second focus based on the determined 3D location of the right eye pupil;
  displaying, by the second display system, the image within the second focus at the 3D location of the right eye pupil for viewing with a right eye of the viewer;
  tracking a positional change of the eye pupils of the viewer based on changes of the infra-red light reflected from the eye pupils of the viewer over time;
  generating a sequential image corresponding to the positional change of the eye pupils, the sequential image including a motion parallax depiction of the image for stereoscopic viewing; and
  responsive to the positional change of the 3D locations of the eye pupils, repositioning hardware components of the first display system and the second display system for the displaying of the images for viewing with the left and right eyes, respectively, of the viewer to track the positional change of the eye pupils for stereoscopic viewing of the sequential image.

15. A method as recited in claim 14, further comprising generating the sequential image to include a rotational depiction of the image for stereoscopic viewing.

16. A method as recited in claim 14, wherein determining the 3D location of the eye pupils of the viewer includes determining the location of the eye pupils without a user attachable device.

17. A method as recited in claim 14, wherein tracking the positional change of the eye pupils of the viewer includes tracking a horizontal positional change of the eye pupils.

18. A method as recited in claim 14, wherein tracking the positional change of the eye pupils of the viewer includes tracking a vertical positional change of the eye pupils.

19. A method as recited in claim 14, wherein tracking the positional change of the eye pupils of the viewer includes tracking a rotational positional change of the eye pupils.

20. A method as recited in claim 14, wherein:
  displaying the image within the first focus includes displaying the image on the first display device and projecting the image through a display lens with a first projection lens for viewing with the left eye of the viewer; and
  displaying the image within the second focus includes displaying the image on the second display device and projecting the image through the display lens with a second projection lens for viewing with the right eye of the viewer.

21. A method as recited in claim 14, wherein:
  displaying the image within the first focus includes displaying the image on the first display device and projecting the image through a Fresnel lens with a first projection lens for viewing with the left eye of the viewer; and
  displaying the image within the second focus includes displaying the image on the second display device and projecting the image through the Fresnel lens with a second projection lens for viewing with the right eye of the viewer.

22. A method as recited in claim 14, wherein tracking the positional change of the eye pupils of the viewer includes:
  illuminating the eyes of the viewer with a first illumination source such that the eye pupils retroreflect infra-red light from the first illumination source;
  capturing a first image set with a first camera and a second camera, a first camera image including retroreflected infra-red light which corresponds to a location of the eye pupils;
  illuminating the eyes of the viewer with a second illumination source such that the eye pupils retroreflect infra-red light from the second illumination source;
  capturing a second image set with the first camera and the second camera, a second camera image including retroreflected infra-red light which corresponds to the location of the eye pupils; and
  comparing the first camera image and the second camera image to determine the location of the eye pupils.

23. One or more computer readable storage devices encoded with a computer program comprising computer executable instructions that, when executed, direct a stereoscopic image display device to perform the method as recited in claim 14.

24. One or more computer readable storage devices encoded with a computer program comprising computer executable instructions that, when executed, direct a stereoscopic image display device to:
  determine three-dimensional (3D) locations of eye pupils of a viewer based at least in part on infra-red light reflected from the eye pupils of the viewer;

display, by a first display system, an image within a first focus at the 3D location of the left eye pupil for viewing with a left eye of the viewer;

display, by a second display system, the image within a second focus at the 3D location of the right eye pupil for viewing with a right eye of the viewer;

track a positional change of the eye pupils of the viewer based on changes of the infra-red light reflected from the eye pupils of the viewer over time;

generate a sequential image corresponding to the positional change of the eye pupils, the sequential image including a motion parallax depiction of the image for stereoscopic viewing and a rotational depiction of the image for stereoscopic viewing.

25. One or more computer readable storage devices as recited in claim 24, further comprising computer executable instructions that, when executed, direct the stereoscopic image display device to determine the 3D location of the eye pupils of the viewer based at least in part on infra-red light reflected from the eye pupils of the viewer without an input from a user attachable device.

26. One or more computer readable storage devices as recited in claim 24, further comprising computer executable instructions that, when executed, direct the stereoscopic image display device to track a horizontal positional change of the eye pupils.

27. One or more computer readable storage devices as recited in claim 24, further comprising computer executable instructions that, when executed, direct the stereoscopic image display device to track a vertical positional change of the eye pupils.

28. One or more computer readable storage devices as recited in claim 24, further comprising computer executable instructions that, when executed, direct the stereoscopic image display device to track a rotational positional change of the eye pupils.

29. One or more computer readable storage devices as recited in claim 24, further comprising computer executable instructions that, when executed, direct the stereoscopic image display device to:

illuminate the eyes of the viewer with a first illumination source such that the eye pupils retroreflect infra-red light from the first illumination source;

capture a first image set with a first camera and a second camera, a first camera image including retroreflected infra-red light which corresponds to a location of the eye pupils;

illuminate the eyes of the viewer with a second illumination source such that the eye pupils retroreflect infra-red light from the second illumination source;

capture a second image set with the first camera and the second camera, a second camera image including retroreflected infra-red light which corresponds to the location of the eye pupils; and compare the first camera image and the second camera image to determine the location of the eye pupils.

30. A stereoscopic image display system, comprising:
an eye pupil acquisition system configured to:
detect eye pupils of a viewer to determine a three-dimensional (3D) location of a left eye pupil relative to a first display system and a 3D location of a right eye pupil relative to a second display system based at least in part on infra-red light reflected from the eye pupils of the viewer; and track a positional change of the eye pupils of the viewer based at least in part on changes of the infra-red light reflected from the eye pupils of the viewer over time;

the first display system configured to display an image within a first focus at the 3D location of the left eye pupil for viewing with a left eye of a viewer;

the second display system configured to display the image within a second focus at the 3D location of the right eye pupil for viewing with a right eye of the viewer; and image generation logic configured to generate a sequential image corresponding to the positional change of the eye pupils, the sequential image including a motion parallax depiction of the image for stereoscopic viewing.

31. A stereoscopic image display system as recited in claim 30, wherein the image generation logic is further configured to generate the sequential image to include a rotational depiction of the image for stereoscopic viewing.

32. A stereoscopic image display system as recited in claim 30, wherein the eye pupil acquisition system is further configured to track a horizontal positional change of the eye pupils.

33. A stereoscopic image display system as recited in claim 30, wherein the eye pupil acquisition system is further configured to track a vertical positional change of the eye pupils.

34. A stereoscopic image display system as recited in claim 30, wherein eye pupil acquisition system is further configured to track a rotational positional change of the eye pupils.

35. A stereoscopic image display system as recited in claim 30, wherein the eye pupil acquisition system is further configured to:

illuminate eyes of the viewer such that the eye pupils retroreflect infra-red light;

capture a first image set including retroreflected infra-red light which corresponds to a location of the eye pupils;

illuminate the eyes of the viewer such that the eye pupils do not retroreflect infra-red light;

capture a second image set including reflected infra-red light; and compare the first image set and the second image set to determine the location of the eye pupils.

36. A method as recited in claim 14, wherein the repositioning the hardware components of the first display system and the second display system for the displaying of the images for viewing with the left and right eyes, respectively, of the viewer to track the positional change of the eye pupils for stereoscopic viewing of the sequential image is based at least in part on minimizing a distance between current 3D locations of the eye pupils and previous 3D locations of the eye pupils.

* * * * *